Aug. 15, 1933.                J. B. DICKSON                1,922,618
                           CATADIOPTRIC LENS
                          Filed July 16, 1932

Inventor
John B. Dickson
By Blackmore, Spencer & Fluit
Attorneys

Patented Aug. 15, 1933

1,922,618

UNITED STATES PATENT OFFICE 1,922,618

CATADIOPTRIC LENS

John B. Dickson, Huntington Woods, Mich., assignor to General Motors Research Corporation, Detroit, Mich., a Corporation of Delaware Application July 16, 1932. Serial No. 622,835

1 Claim. (Cl. 240—8.3)

This invention relates to lamps for automobiles and especially to the type used at the rear of the car.

The object of the invention is to improve the efficiency of the lamp both as a tail light and as a stop signal or backing light. The increased efficiency is obtained by employing a lens of the type described and claimed in my copending application, Serial No. 427,269, filed February 10, 1930, and by properly locating the light sources for the different signals. It is desirable in this kind of lamp to provide contrast in brightness between the stop signal and the tail light signal, and this I have likewise accomplished by proper arrangement of the light sources.

Figures 1, 2, 3:
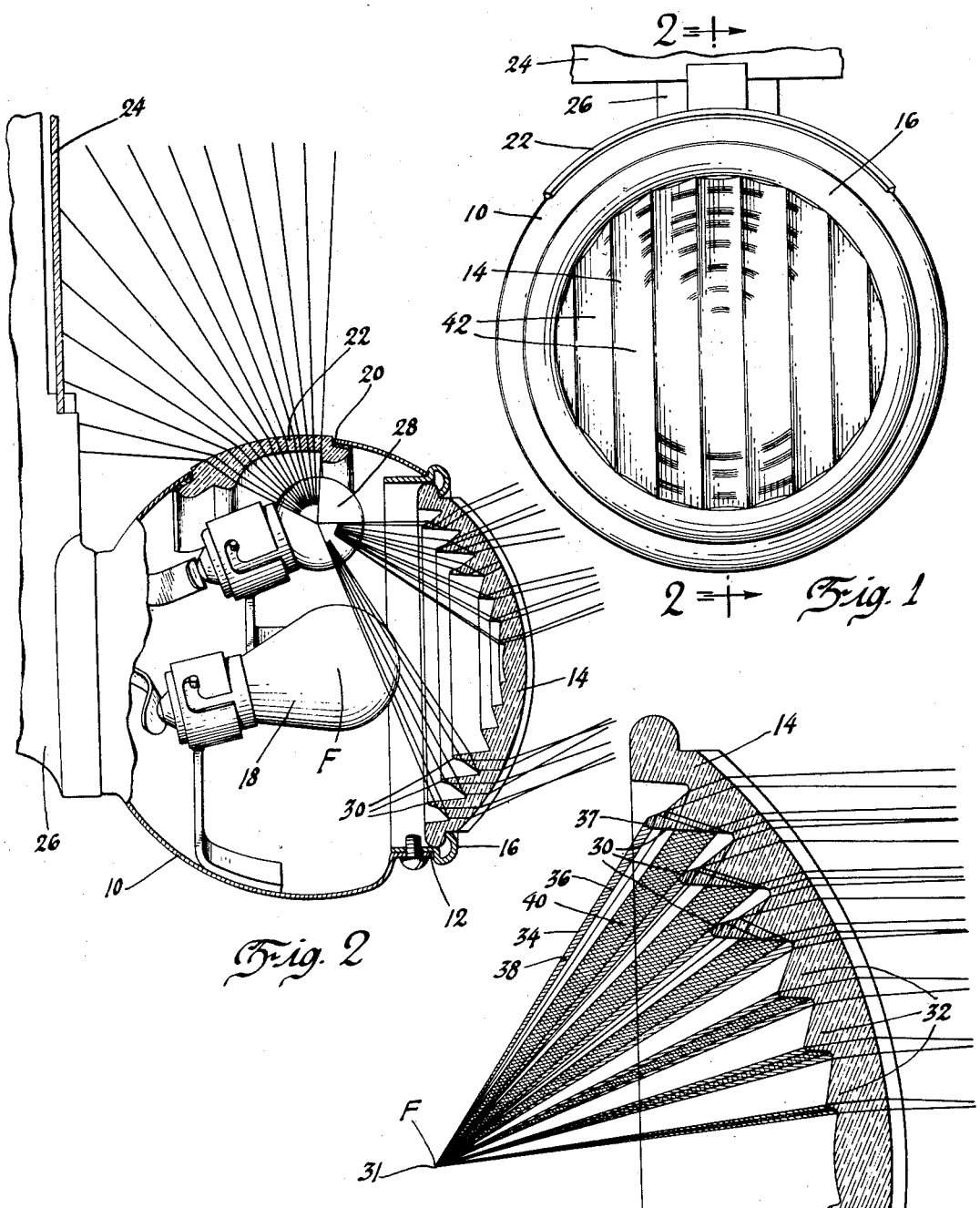
Figure 1 is a rear view of my improved lamp mounted in proper relation to the license plate.
Figure 2 is a section on line 2—2 of Figure 1 showing the direction of rays emanating from the tail light.
Figure 3 is an enlarged section of the upper half of the lens of Figure 2, showing the direction taken by rays from the stop light or backing light.

My improved lamp comprises a housing 10, apertured at 12 to receive lens 14, mounted in bezel 16. The focus of this lens is indicated at F. An incandescent bulb 18 provides a source of light at the focus. The bulb may be mounted in the lamp in any desired manner. The housing 10 is likewise apertured at 20 to receive the license plate illuminating lens 22, which may be of the type described and claimed in the prior patent of R. N. Falge 1,795,940 granted March 10, 1931, 24 indicates a portion of the usual license plate which is shown as mounted on bracket 26 to which the tail lamp 10 is secured. An incandescent bulb provides a source of light 28 just below the tail light lens 22, and at a point sufficiently high in the housing so that the light from the source reaches the upper surface of the catadioptric rings 30, formed on the lens 14. The light source 28 may be mounted in the lamp in any preferred manner. With the bulb 28 mounted in the manner described, it will be apparent that the license plate 24 is evenly illuminated, and owing to the fact that the bulb is very close to the lens 22, filaments of low candle power may be used. By tracing the rays shown in Figure 2, it will likewise be apparent that a beam of light from source 28 is thrown upwardly from the tail light lens 14 by the action of the catadioptric rings. This action consists in refraction at the incident surface, internal reflection at the lower surface of the rings, and refraction when the rays emerge from the outer face of the glass. This action occurs principally at the top and bottom of the lens as indicated by the arcuate lines on Figure 1. These lines show the spots brilliantly illuminated by the catadioptric action of the lens. The remainder of the lens is more faintly illuminated by a diffused red glow.

There is also considerable projection of light in a downwardly direction through the other portions of the lens, but this is not useful light, as it is not visible at a distance.

In Figure 3 I have shown the action of the lens 14 upon rays emanating from a source 31 at the focus, such as the usual stop light or backing light. In this design there is some sacrifice of efficiency because of the convexity of the lens. If desired, the lens could be of reverse curvature as illustrated in Figure 2 of my prior application. However, whatever be the contour of the lens, its action is the same in principle. The rings marked 32 have dioptric action only; they refract the rays after the manner of the ordinary bull's eye lens, directing them into a substantially parallel bundle along the lamp axis. It will be noted that in the case of the catadioptric rings 30 some of the rays, such as that numbered 34, strike the inner face of the ring are refracted and then reflected from the upper face of the ring and again refracted as they emerge from the lens. Other rays, such as 36, undergo double reflection, first at the upper face of the ring, then at the lower face, and, in addition, undergo refraction, as in the case of the other rays. The double reflection is accomplished by the provision of tips 37 on the catadioptric prisms. These tips are of reduced angle. Their lower faces lie in the plane of the lower faces of the main body of the rings, and the design is such that both upper and lower faces make an angle of at least two degrees with the axis of the lens to permit easy withdrawal of the die or plunger from the glass. Without these tips the efficiency of the lens would be much reduced for the rays they intercept would otherwise simply be diffused by refraction upon their passage through the lens. This will be clear from the following.

In Figure 3, I have indicated the proportion of the light striking the lens that is useful for signal purposes. The part cross-hatched as at 38 strikes either the tips of the rings or the bottoms of the space between rings. These portions must be rounded off to permit manufacture of the lens by pressing, and because it is rounded off, the light striking it is diffused and very much reduced insofar as its effectiveness is concerned. The portions of the light cross-hatched as at 40 undergo simple refraction, and are likewise more or less diffused, although the light is of some value to an observer near the car. The remainder is the portion of the light that furnishes the useful stop signal. This is enhanced by the rays intercepted by the tips that would otherwise simply be diffused by refraction like the portions 40.

The described construction provides a marked contrast in lighting between the stop signal and the tail light, not only because of the greater candle power of the bulb 18, but also because the bulb 18 is more favorably located since it is at the focus. I have indicated at 42 concave flutes provided on the outer face of the lens. These flutes spread the light laterally to the extent desired.

As a modification of my invention it may be satisfactory for some purposes to make the dioptric and catadioptric ribs rectilinear instead of curved. With this construction the focus will be a line instead of a point. The light will be scattered considerably to the sides of the road.

I claim:

In a lamp for automobiles, the combination of a housing having an aperture therein, a lens in the aperture provided with an annular dioptric prism and with surrounding annular catadioptric prisms, said prisms having a common focus, a source of light at the focus, the rays from said source striking the lower surface of said catadioptric prisms and refracted and reflected thereby uniting with the rays passing through the dioptric prism to form a beam of substantially parallel rays, a source of light arranged above the focus so as to cast its rays upon the upper surface of said catadioptric prisms, a portion of said rays being refracted and reflected thereby and emerging as a second beam, said housing being provided with a second opening adjacent said second source for the projection of light therethrough for the illumination of adjacent objects.

JOHN B. DICKSON.